May 19, 1942.　　F. G. DICKINSON ET AL　　2,283,493
LINE INDICATOR
Filed Jan. 16, 1941　　3 Sheets-Sheet 1

F. G. Dickinson
A. G. Croninger
INVENTORS.
BY C. A. Snow & Co.
ATTORNEYS.

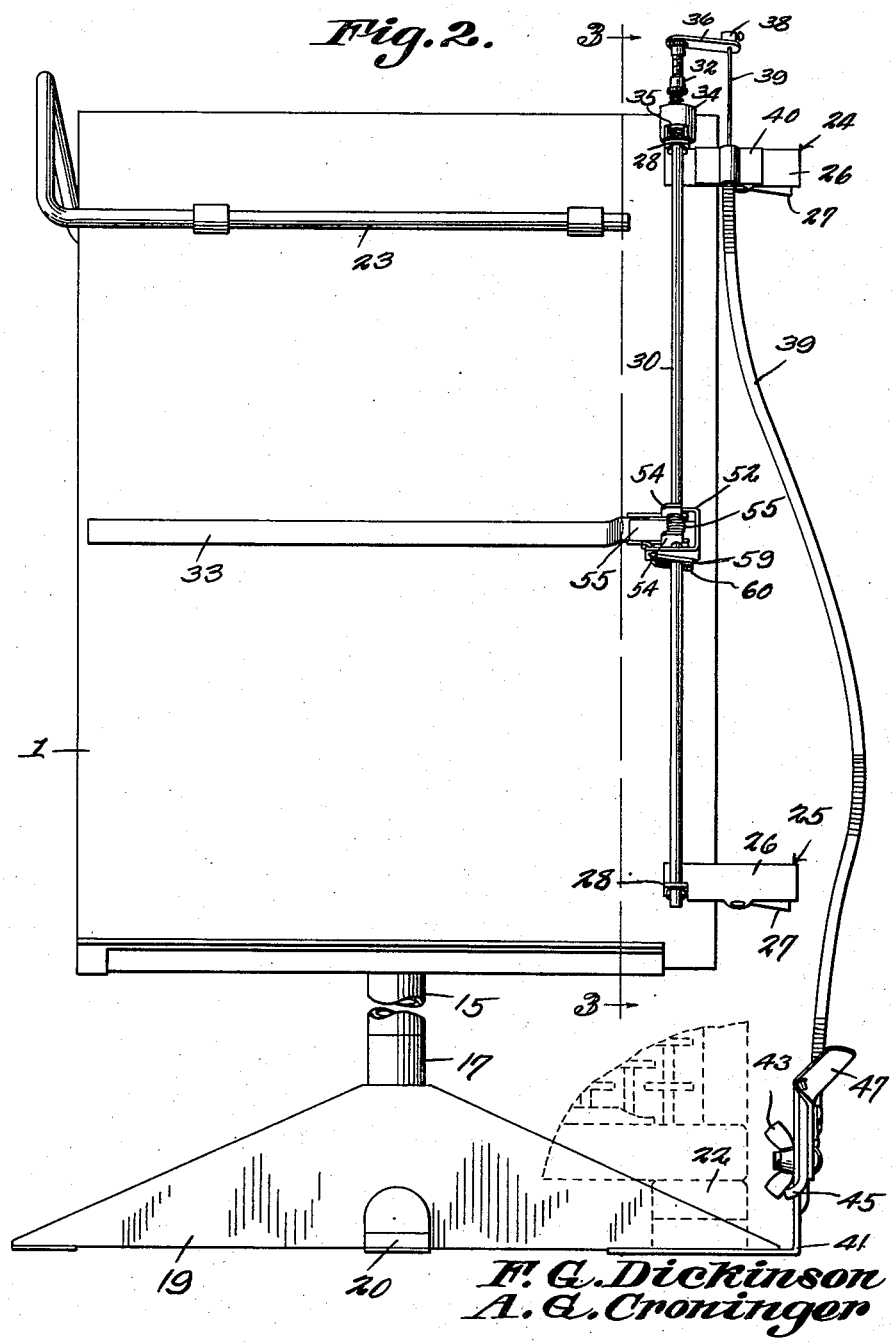

May 19, 1942.   F. G. DICKINSON ET AL   2,283,493
LINE INDICATOR
Filed Jan. 16, 1941   3 Sheets-Sheet 3
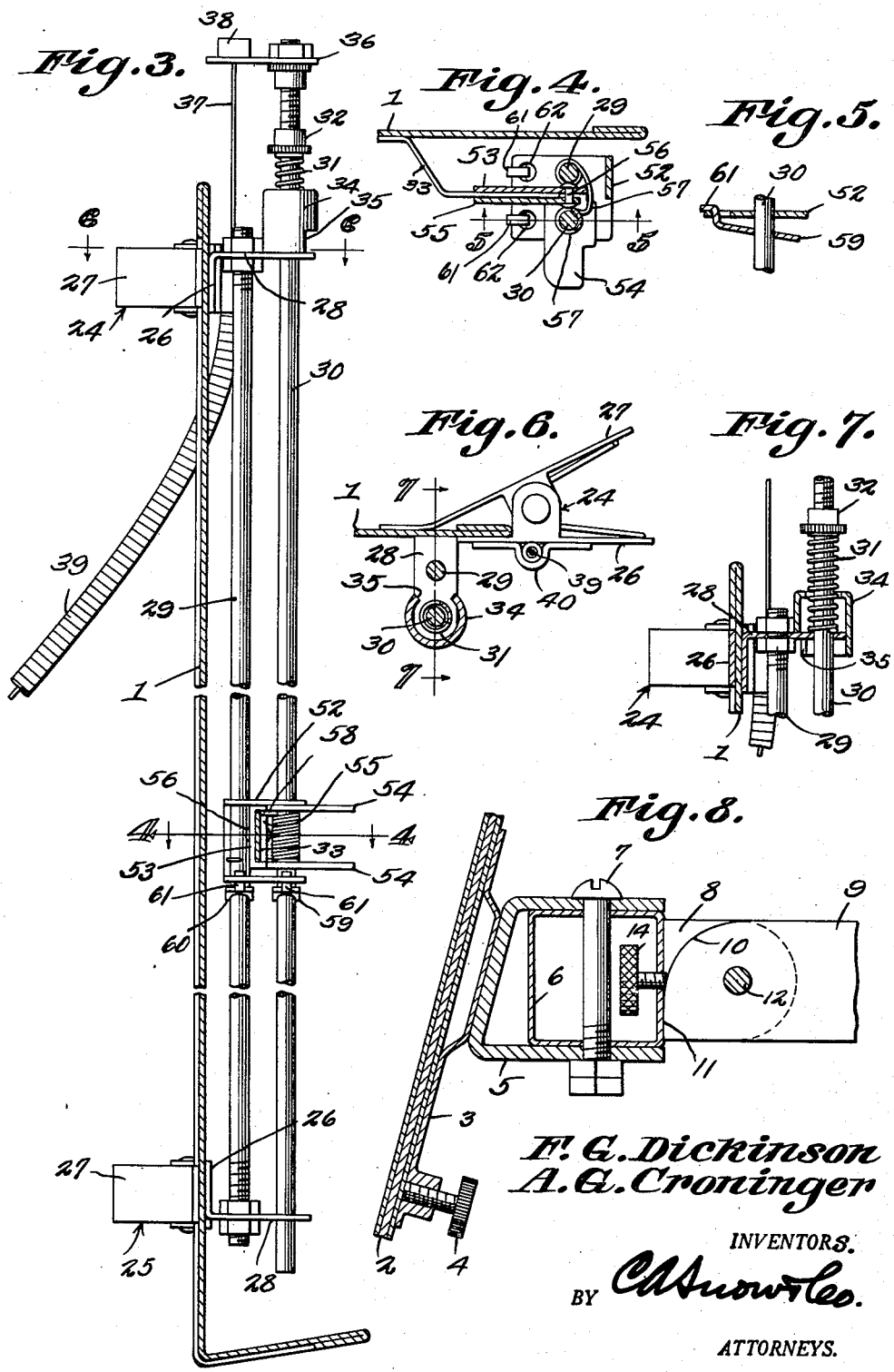
F. G. Dickinson
A. G. Croninger
INVENTORS.
BY
ATTORNEYS.

Patented May 19, 1942

2,283,493

UNITED STATES PATENT OFFICE 2,283,493

LINE INDICATOR

Frank G. Dickinson, Champaign, Ill., and Arthur G. Croninger, Miami, Okla.

Application January 16, 1941, Serial No. 374,776

4 Claims. (Cl. 120—34)

This invention aims to provide novel means whereby a line finding finger may be advanced downwardly, along a copyholder, to direct the eye of a typist to matter which is to be copied, in accordance with the well known function of line finders.

The invention aims, further, to provide novel means whereby step by step downward movement is imparted to the line finding finger and associated parts. Another object of the invention is to supply novel means for actuating the operating member by which motion is transmitted to the line finding finger. A further object of the invention is to supply novel means whereby the actuating lever, which is immediately under the control of an operator, may be adjusted to different positions.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 shows, in front elevation, a device constructed in accordance with the invention, parts of the copyholder being broken away;

Fig. 3 is a vertical section taken on the line 3—3 of Fig. 2;

Fig. 4 is a transverse section on the line 4—4 of Fig. 3;

Fig. 5 is a section on the line 5—5 of Fig. 4;

Fig. 6 is a section on the line 6—6 of Fig. 3;

Fig. 7 is a section on the line 7—7 of Fig. 6;

Fig. 8 is a vertical section taken through a portion of the copyholder.

Figure 1:
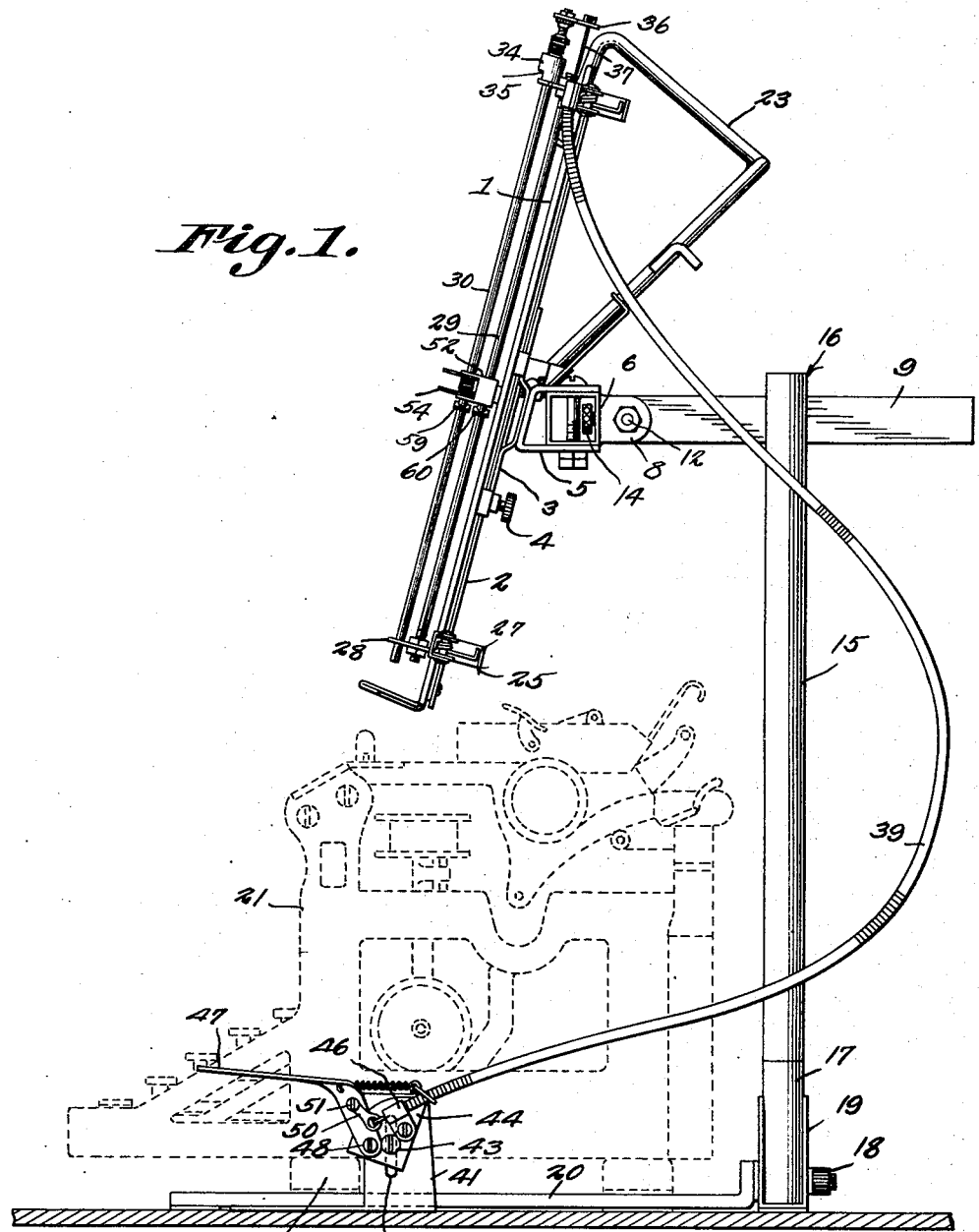
Fig. 1 shows, in side elevation, a line finder constructed in accordance with the invention, assembled with a copyholder.

The device forming the subject matter of this application is a line indicator, adapted to be used on a copyholder, for the convenience of typists. In order that a clear understanding of the invention may be obtained readily, the copyholder, first, will be described briefly.

The numeral 1 marks a table, inclined with respect to the vertical. On its back, the table 1 has a longitudinal track 2, mounted to slide for adjustment in a guide 3. A set screw 4 is threaded into the guide 3 and is adapted to engage the track 2. A rearwardly extended fork 5 is secured to the track 2.

As shown in Fig. 8, the fork 5 spans a head 6. The fork 5 and parts carried by it are mounted to swing horizontally on a vertical pivot element 7 carried by the head 6. The head 6 has backwardly extended flanges 8.

Between the flanges 8 of the head 6 is received the forward end of a horizontal arm 9. It appears in Fig. 8 that at its forward end, the arm 9 has a cam surface 10, leading to a vertical abutment shoulder 11 on the forward edge of the arm. The flanges 8 of the head 6 are mounted to swing vertically on a horizontal pivot element 12 carried by the arm 9. When the table 1 is in the inclined position shown in Fig. 1, the rear part of the head 6 abuts against the shoulder 11. The head 6 and parts carried by it, however, can be tilted backwardly from the position shown in Fig. 8, and when that is done, they are held in adjusted positions by means of a set screw 14, threaded into the rear part of the head 6 and adapted to engage the cam edge 10 of the arm 9.

The arm 9 slides horizontally in the upper member 15 of a standard 16. The upper member 15 of the standard 16 is connected to the lower member 17 of the standard for adjustable rotation about a vertical axis. The lower member 17 of the standard is detachably connected at 18 to a transverse foot 19 and to a horizontal base piece 20, adapted to extend under a typewriter 21, one of the forward feet of the typewriter being designated in Fig. 2 by the reference numeral 22.

Without alluding to each of the parts hereinbefore referred to, those skilled in the art will understand that the table 1 may be disposed in a variety of positions, as the nature of the work may demand, or as the tastes and habits of the typist may dictate. The table 1 may be provided with a paper holder 23, of any approved or desired form.

It is with a copyholder of the kind described, or with any other analogous structure, that the device forming the subject matter of this application is adapted to be used.

The line indicator characterizing the present application is held on one edge of the table 1 by an upper retainer 24 and a lower retainer 25, the retainers being pinch clips, if preferred, each pinch clip including a forward jaw 26 and a rear jaw 27. The forward jaws 26 of the pinch clips 24 and 25 are supplied with forwardly extended flanges 28, in which is secured a track rod 29, disposed parallel to the table 1.

An operating member, in the form of a rod 30, is mounted for limited reciprocation in the flanges 28 of the pinch clips 24 and 25, in parallelism to the track 29. The operating member 30 is moved downwardly, at the will of a typist, by a mechanism to be described hereinafter. The downward movement of the rod 30 is a working stroke, and the upward movement of the rod 30 is a return stroke. The upward or return stroke of the operating member 30 is accomplished by means of a coiled spring 31, which is a compression spring. As shown in Fig. 7, the lower end of the spring 31 bears on the flange 28 of the upper pinch clip 24, the spring surrounding a portion of the operating rod 30. The upper end of the return spring 31 engages an adjustable abutment 32, for example, a nut threaded on the rod 30.

The longitudinal movement of the operating member 30 is for the purpose of moving downwardly, step by step, along the table 1, a linefinding finger 33, shown in Fig. 2. Sometimes, it is desired that the finger 33 shall make a double-space step downward: and sometimes it is desired that the finger shall take a single-space step downward. A means under the control of an operator is provided, whereby the finger 33 may be caused to perform a single-space step or a double-space step. That mechanism appears to best advantage in Figs. 7 and 6 of the drawings.

The operating rod 30 passes freely through an inverted cup-shaped stop 34, as does the return spring 31. The stop 34 has a side notch 35. If the notch 35 is disposed toward the front, as in Fig. 3, the stop 34 rests on the flange 28 of the uppermost pinch clip 24. If, however, the stop 34 is rotated until the notch 35 is toward the rear, as in Fig. 7, then the stop can move downwardly from the position of Fig. 3, the flange 28 of the uppermost pinch clip 24 being received in the notch. The abutment 32 on the operating rod 30 engages the stop 34, as the rod moves downwardly. If the stop 34 is in the elevated position of Fig. 3, the finger 33 of Fig. 2 will make a single-space downward step: but if the stop is in the lowered position of Fig. 7, the finger will make a double-space downward step. If less than a single-space downward step is wanted, for instance where fine printed matter is being copied, this may be accomplished by limited movement of the lever 47.

The stop mechanism need not be of the form hereinbefore described. Another suitable mechanism for the end in view will be referred to hereinafter.

An actuating mechanism is supplied, for imparting longitudinal reciprocation to the operating rod 30, or, more accurately speaking, for the purpose of carrying the operating rod downwardly, to make its working stroke. That mechanism embodies a lateral bracket 36, secured to the upper end of the operating rod 30. A flexible element 37, such as a wire, passes through the bracket 36, a set collar 38 being secured to the wire 37, for engagement with the bracket 36. The flexible element 37 passes through a flexible sheath 39. The upper end of the sheath 39 is secured by a fastener 40 to the forward jaw 26 of the uppermost pinch clip 24.

An anchor 41 is supplied, and is in the form of an angle member, including a horizontal flange and a vertical flange. The anchor 41 may be held in place in any desired way. As shown in Figs. 1 and 2, the horizontal or bottom flange of the anchor 41 is engaged beneath the foot 22 of the typewriter 21. In the vertical, upstanding flange of the anchor 40, there is an elongated slot 42, best shown in Fig. 1. The slot 42 receives, for vertical adjustment, a clamping bolt 43, holding on the outer surface of the vertical flange of the anchor 41, a supporting plate 44 having, at its forward edge, a transverse projection 45 (Fig. 2) engaging the forward edge of the upright flange of the anchor 41. The supporting plate 44 is provided with a fastener 46 (Fig. 1) which retains on the plate 44, the lower end of the sheath 39.

A lever 47 is fulcrumed at 48 on the supporting blade 44 for vertical swinging movement, alongside the typewriter 21. One end of a lifting or return pull spring 46 (Fig. 1) is attached to the lever 47, the opposite end of the pull spring being connected to the sheath 37, or being anchored otherwise. A short radius arm 50 is held by a clamp screw 51 on the lever 47. The lower end of the wire 37, which slides in the sheath 39, is connected to the radius arm 50. The radius arm 50 can be disposed in different positions, and be held by the clamp screw 51, to the end that the flexible element 37 may pay freely through the sheath 39.

By loosening the clamping bolt 43 of Figs. 2 and 1, the supporting plate 44 may be raised and lowered, the clamping bolt moving vertically in the slot 42 which is formed in the vertical flange of the anchor 41. Moreover, the supporting plate 44 can be swung on the clamping bolt 43, parallel to the elevational plane of Fig. 1. When the supporting plate 44 has been adjusted to the desired position, the clamping bolt 43 may be set up. The adjusted position of the supporting plate 44 is made the more secure, because, as shown in Fig. 2, the projection 45 of the supporting plate engages the forward edge of the upright flange of the anchor 41. Owing to the fact that the supporting plate 44 has the various adjustments referred to, the lever 47 (Fig. 1) may be raised or lowered, to a convenient position, and the inclination of the touch end of the lever 47 may be regulated as occasion may require.

A U-shaped carriage 52 (Figs. 4 and 3) is mounted to slide on the track rod 29 and on the operating rod 30, the statement "mounted to slide" being subject to some qualifications, in the operation of the machine, which will be explained hereinafter. The numeral 53 designates a trough-shaped member, which is disposed at right angles to the operating rod 30 and the track rod 29. The trough-shaped member 53 has forwardly presented, rectangularly disposed fingers 54, through which the operating rod 30 passes, the trough-shaped member thus being mounted on the operating rod, for swinging movement, transversely thereof. The trough-shaped member 53 and its fingers 54 extend between the upper and lower walls of the carriage 52.

A spring tongue 55 extends lengthwise of the trough-shaped member 53 and is connected thereto by a securing element 56. The trough-shaped member 53 and the spring tongue 55 thus form a socket, in which one end of the line finding finger 33 of Fig. 2 is removably mounted. It is possible to remove the finger 33 from the socket 55—52, and to substitute therefor, a finger of different length.

The numeral 57 in Fig. 4 marks a coiled spring disposed somewhat loosely about the operating rod 30, and engaged slidably around the track rod 29. Figure 3 shows that the spring 57 terminates in an arm 58, which bears against the trough-shaped member 53 and tends to swing that member, along with the part 33 of Fig. 2, toward the table 1, for engagement with the paper (not shown) on the table. By means of the parts 54, shown in Fig. 4, the operator can swing the socket 53—55 and the part 33 of Fig. 2 away from the paper on the table 1, when such an operation is desired.

Beneath the lower wall of the carriage 52 is located a pair of latches 59 and 60. The operating rod 30 passes through the latch 59, and the track rod 29 passes through the latch 60. The latches 59 and 60 have hooks 61, engaged through openings 62 in the lower wall of the carriage 52, and, thus, the latches tend to swing downwardly, by gravity, to the position indicated in Fig. 5 of the drawings.

The latch 59, cooperating with the operating rod 30, and the latch 60, cooperating with the track rod 29, prevent the upward movement of the carriage 52 relatively to both rods. If it is true that the latch 59 prevents the upward movement of the carriage 52 with respect to the operating rod 30, it is equally true that the latch 59 prevents the downward movement of the operating rod 30 relatively to the carriage 52.

Each time that the operating rod 30 moves downwardly, the carriage 52 is carried downwardly one step, the latch 60 sliding over the track rod 29. When the operating rod 30 starts to move upwardly, responsive to the spring 31, the latch 59 loses its hold on the operating rod 30, and the operating rod can continue its upward movement relatively to the carriage 52, the carriage being held against upward movement by the hold of the latch 60 on the track rod 29. The result is that the carriage 52 is moved downwardly, step by step, as the operating rod 30 is reciprocated, the finger 33 of Fig. 2 moving downwardly over the paper on the table 1, step by step.

The carriage 52 and the line indicating finger 33 of Fig. 2 ultimately reach the lowermost position. In order to raise the carriage 52 and the line indicating finger 33, the operator lifts the latches 59 and 60 (Figs. 3 and 5), the hold of the latches on the rods 40 and 29 is broken, and the carriage and the part 33 can be slid upwardly, to begin, anew, their downward movement. It is to be observed that the carriage 52 and associated parts are guided in their reciprocation by both of the rods 29 and 30, which are spaced apart transversely, it being impossible, therefore, for the carriage 52 to swing around either rod horizontally.

The operation of the device has been explained hereinbefore, in connection with its various component mechanisms, but a brief resume may be given at this place.

The operator tilts the lever 47 on its fulcrum 48, the wire 37 drawing downwardly the operating rod 30, the spring 31 being compressed. The carriage 52 and the line finding finger 33 of Fig. 2 are carried downwardly one step, in the manner hereinbefore described. When the lever 47 is released, the operating rod 30 is raised, responsive to the action of the spring 31, and the machine is ready to move the line finding finger 33 downwardly another step. (The functions of the latches 59 and 60 having been explained in detail hereinbefore.

The word "rod" as used herein means anything capable of exercising the functions of the parts 29 and 30.

What is claimed is:

1. In a line indicator, a support, a track rod and an actuating rod disposed in approximately parallel relation and carried by the support, a carriage mounted for reciprocation on both rods, a line finder engaged with the carriage for reciprocation along one rod and for swinging movement with respect to the carriage and on said rod transversely thereof and independently of the other of said rods, means for imparting reciprocation to the actuating rod, and an automatically engageable and releasable connection between the carriage and the actuating rod.

2. In a line indicator, a support, a track rod and an actuating rod disposed in approximately parallel relation and carried by the support, a carriage mounted for reciprocation on both rods, a line finder engaged with the carriage for reciprocation along one rod and for swinging movement on said rod transversely thereof, means for imparting reciprocation to the actuating rod, an automatically engageable and releasable friction grip feed connection between the actuating rod and the carriage and independent of the track rod, and an automatically engageable and releasable friction grip backstop connection between the carriage and the track rod and independent of the actuating rod.

3. In a line indicator, a support, a track rod and an actuating rod disposed in approximately parallel relation and carried by the support, a carriage mounted for reciprocation on both rods, a line finder engaged with the carriage for reciprocation along one rod and for swinging movement on said rod transversely thereof, an automatically engageable and releasable feed connection between the actuating rod and the carriage, means under the control of an operator for imparting a feed stroke to the actuating rod, an abutment on the actuating rod, and adjustable means interposed between the support and the abutment for varying the length of the feed stroke, said means comprising a stop, the lower end of which is engageable with the support, the stop having a side notch, the upper end of which defines a transverse shoulder, the stop being rotatable on the actuating rod, to dispose the lower end of the stop clear of the support, and to dispose the shoulder for engagement with the support.

4. In a line indicator, a support, a track rod and an actuating rod disposed in approximately parallel relation and carried by the support, a carriage mounted for reciprocation on both rods, a line finder engaged with the carriage for reciprocation along one rod and for swinging movement on said rod transversely thereof, an automatically engageable and releasable feed connection between the actuating rod and the carriage, means under the control of an operator for imparting a feed stroke to the actuating rod, an abutment on the actuating rod, a return spring interposed between the support and the abutment, and adjustable means interposed between the support and the abutment for varying the length of the feed stroke, said means comprising a stop rotatable on the actuating rod and having transverse parts spaced longitudinally of the actuating rod and respectively engageable with the support when the stop is rotated.

FRANK G. DICKINSON.
ARTHUR G. CRONINGER.